March 12, 1940. J. B. STRAUSS 2,193,046
AUTOMOTIVE TRAIN
Filed March 14, 1938 3 Sheets-Sheet 1
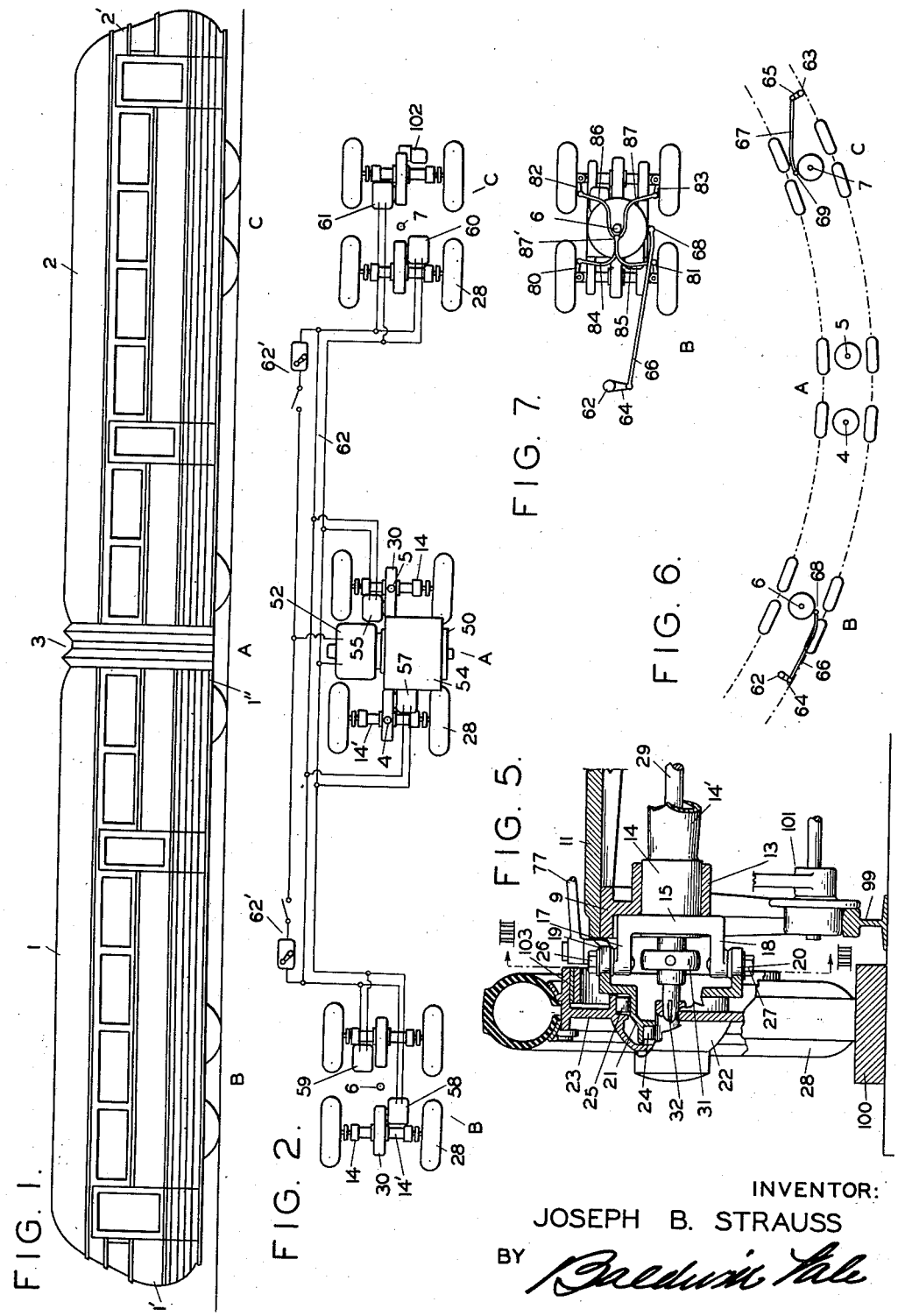
INVENTOR:
JOSEPH B. STRAUSS
BY Baldwin Sale
ATTORNEY.

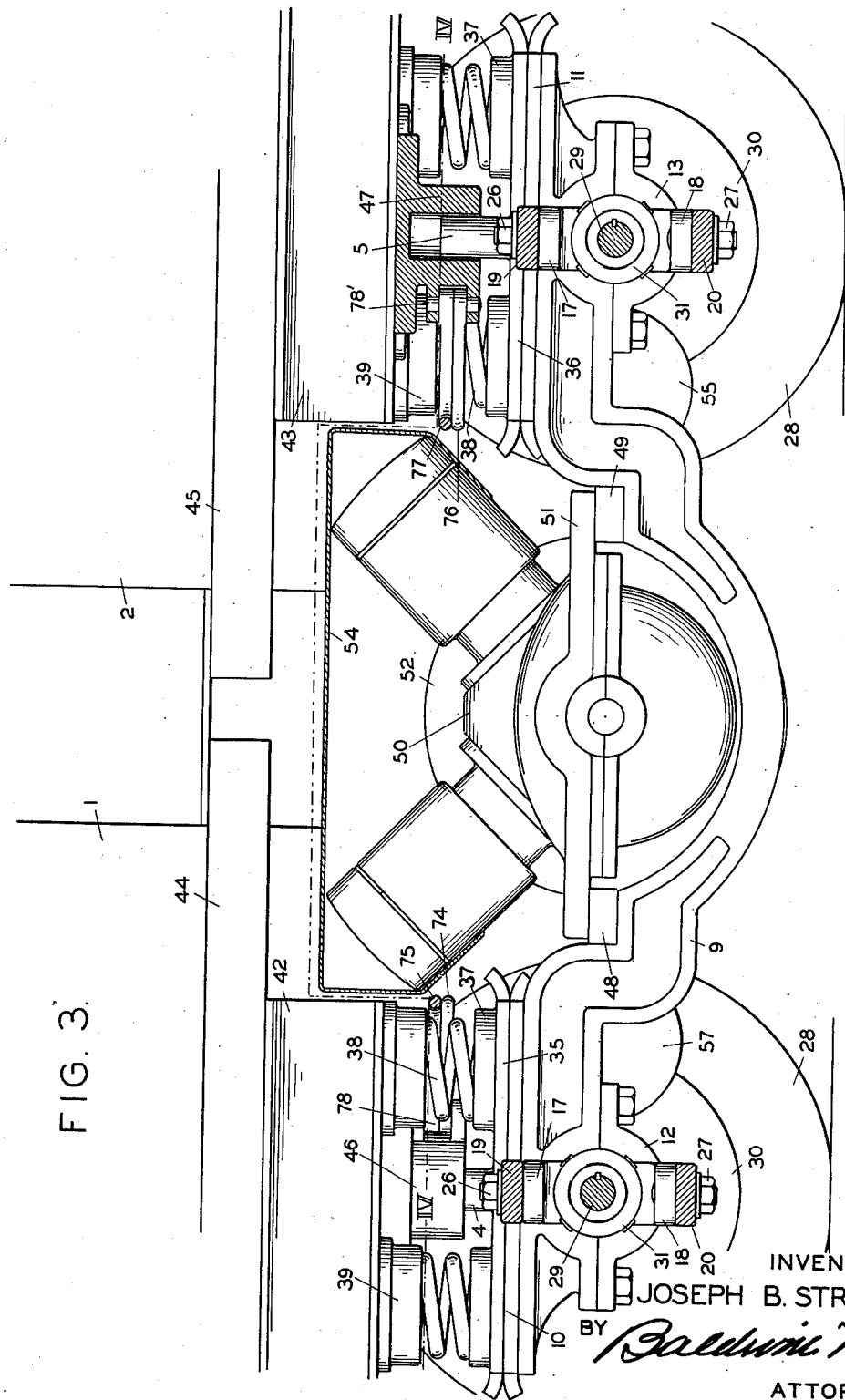

March 12, 1940.  J. B. STRAUSS  2,193,046
AUTOMOTIVE TRAIN
Filed March 14, 1938   3 Sheets-Sheet 3

INVENTOR:
JOSEPH B. STRAUSS
BY
ATTORNEY

Patented Mar. 12, 1940

2,193,046

UNITED STATES PATENT OFFICE 2,193,046

AUTOMOTIVE TRAIN

Joseph B. Strauss, San Francisco, Calif.; Annette Strauss, John Sparks, and Henry C. Clausen, executors of said Joseph B. Strauss, deceased Application March 14, 1938, Serial No. 195,718

3 Claims. (Cl. 105—4)

This invention relates to automotive trains and, more particularly, to a centrally located motor generator truck and the distribution of motive power therefrom.

Among the objects of the invention is to simplify the generation and application of motive power to the traction means of automotive trains.

Another object is to locate the generation of power on the traction trucks with the great advantage that the pay load of passenger coaches and freight cars can be increased.

Another object is to remove incidental vibration, heat, odor, and other objectionable conditions from the passenger and freight areas of traction common carriers.

Another object is to facilitate maintenance of the motive mechanism by locating it for convenient access.

Other objects and advantages will appear as the description progresses.

In this specification and the accompanying drawings, the invention is disclosed in its preferred form. But it is to be understood that it is not limited to this form, because it may be embodied in modifications within the purview of the claims following the description.

In the three sheets of drawings:

Fig. 1 is a side elevation of a dual coach train having this invention applied thereto.

Fig. 2 is a diagrammatic plan view of the arrangement of the traction trucks and the application of power thereto.

Fig. 3 is an enlarged detail in side elevation of the motor-generator truck unit, partly in vertical section, taken along the line III—III in Fig. 5.

Fig. 5 is a fragmentary detail in front elevation of a wheel mounting partly broken away to show the interior structure.

Fig. 6 is a diagrammatic lay out of the steering gear.

Fig. 7 is a diagrammatic plan view of one of the trucks supporting the outer ends of the cars and schematically illustrating the automatic means for individually steering the wheels thereof.

Figure 4:
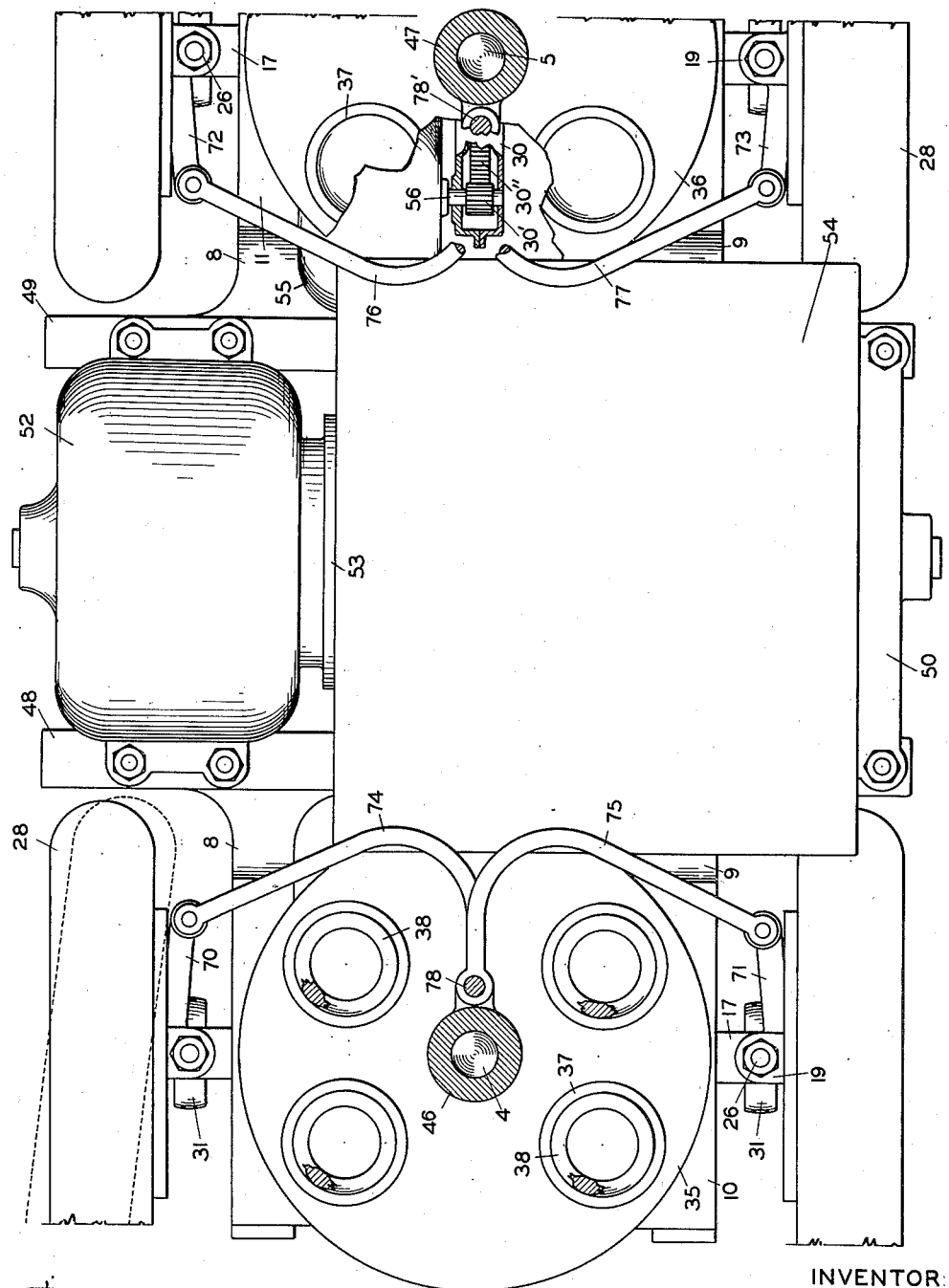
Fig. 4 is a plan view of the same, partly in cross section taken on the line IV—IV, Fig. 3.

In detail, the construction illustrated in the drawings, referring first to Fig. 1, comprises the coaches 1 and 2, vestibuled at 3 and articulated on the king pins 4 and 5 (see also Fig. 2) respectively on opposite sides of the center of the center truck A, (see Figs. 2 and 3). The opposite ends of the coaches are centrally pivoted on their respective trucks B and C on the king pins 6 and 7. Passenger coaches have been illustrated, but the invention is equally applicable to freight carriers.

The truck A, Figs. 3 and 4, comprises the side beams 8 and 9, rigidly joined at their opposite ends by the flat bolsters 10 and 11 to form a rigid rectangular frame. The clamp collars such as 12 and 13 are formed in the four corners of the truck to engage the bearing housings 14 on the opposite ends of the axle 14', see Fig. 5. The pivot brackets 17 and 18 project from the yoke 15 on the bearing housings 14 in vertical alinement coincident with the similar brackets 19 and 20 on the skein 21 upon which the hub 22 of the wheel 23 rotates on the interposed antifriction bearings 24 and 25 in the usual manner. The alined pivots 26 and 27 engaging the registering brackets form a caster mounting or steering knuckle for the wheel 23 upon which the pneumatic tire 28 is mounted.

The wheel is driven by the shaft 29 extending from the differential housing 30 through an antifriction bearing in the axle 14'. The universal joint 31 is interposed between the end of the axle and the tapered spindle 32 to which the hub 22 is keyed. This form of mounting and drive is common to all the wheels of the train.

The central portions of the bolsters 10 and 11 constitute turntables concentric with the respective king pins 4 and 5 which are fixed thereon. The chafing plates 35 and 36 rest upon the turntables upon which they oscillate. These plates have sockets 37 to receive the coil springs 38 engaging similar sockets 39 on the longitudinal beams 42 and 43 beneath the floors 44 and 45 of the coaches 1 and 2 respectively. The sockets 46 and 47 on these beams engage their respective king pins 4 and 5 whereby the adjacent ends of the coaches are supported by and articulated on the opposite ends of the center truck A.

The truck frame has the transverse interspaced bars 48 and 49 fixed to the opposite side beams 8 and 9. The motor-generator unit comprises the multicylinder internal combustion engine 50, the base 51 of which is bolted to the bars 48 and 49. The electric generator 52 forms an integral part of the motor unit and is also bolted to the bars 48 and 49 and to the engine base, as at 53. The armature of the generator is keyed to the motor-shaft and rotates therewith, acting also as the engine flywheel. When unbolted, the motor-generator unit 50—52 can be slid on the bars 48, 49 and withdrawn from the truck in either direction for repair or replacement. The engine hood 54 is provided as a protection against wheel splash. The conventional details such as fuel tanks, radiators, switch boards, rheostat controls, and the like have been omitted to clarify the disclosure as non-essential for those skilled in the art.

The several trucks A, B, and C have electric motors geared to their wheel shafts 29—29. The installation being similar in each instance, only one will be described in detail, as in Fig. 4, where the turntable 36 has been broken away to disclose the motor 55 bolted to the axle 15 and the bar 49. The motor-shaft 56 extends into the differential gear housing 30 and has a pinion 30' thereon enmeshed with the ring gear 30'' of the differential. A motor 57 is similarly mounted in relation to the opposite differential gearing. The trucks B and C have the motors 58 and 59 and 60 and 61 similarly mounted on their respective axles to drive the wheels, see Fig. 2. These motors are all in the electric circuit 62 with the generator 52, and the switches and rheostat controls indicated at 62' in the motorman's compartments at the ends 1' and 2' of the coaches. The train is thus adapted to be controlled from either end by suitable wiring for starting, stopping, and reversing the motors 55—61 as desired.

In addition to the previously enumerated advantages in mounting the motor-generator and motors directly on the axles is the low center of gravity, as compared with the prior practice of locating the motive unit above the spring suspension 38.

The steering gear is schematically shown in Figs. 6 and 7. The removable steering posts 62 and 63 project upwardly into the motorman's compartments 1' and 2' respectively. The lower ends of these posts have the arms 64 and 65 fixed thereon and pivoted to the links 66 and 67 which are pivoted at 68 and 69 on their respective truck frames B and C. By means of a steering wheel on the post 62 the motorman can swing the lead truck B on the king pin 6 relative to the body of the coach 1. The arms 80, 81, 82, and 83 on the several steering knuckles 29 have the separate links 84, 85, 86, and 87 pivoted at 87' on the coach body eccentric to the king pin 6 on truck B. As the truck B is manually swung relative to the body of the coach, the various wheels of the truck are castered relative to the truck frame, tangential to the arc of the desired turn.

When the front end 1' of the coach 1 swings into a turn to the right, the rear end 1'' swings to the left relative to the king pin 4. The arms 70 and 71 on the front wheels of the center truck A are pivoted at 78 on the body of the coach eccentric to the king pin 4 by the links 74 and 75 respectively which swing these wheels tangentially to the arc of the turn to condition the center truck A to follow the lead truck B in negotiating the turn either right or left.

The rear wheels of the center truck are similarly controlled by the links 76 and 77 pivoted at 78'' to the body of the coach 2 eccentric to the king pin 5 and to the arms 72 and 73 on the steering knuckles of their respective wheels to proportionally condition these wheels for the turn.

The four wheels of the rear truck C are similarly controlled from an eccentric pivot so as to cause them to automatically respond to the manual steering of the lead truck B, previously described, as the coach 2 swings into the arc of the turn.

To reverse the direction of train travel, the motorman transfers the steering wheel to the opposite end of the train where all engine and motor controls are duplicated.

While two articulated coaches have been shown, the train can be lengthened to any practical extent by duplicating the units described. In Fig. 5 is shown a fragmentary detail of a conventional railway track with rails such as 99 with parallel runways 100 for the tires 28. For further particulars see my copending application for patent, filed November 30, 1937, entitled Rapid transit systems, Serial Number 177,215. The present train can be automatically steered by the pilot trucks 101 pivoted to the trucks B and C and adapted to be lowered into engagement with the rails 99 to hold the traction trucks in alinement with the rails as desired.

The air compressor 102 is geared to one of the differential gears to furnish compressed air for the wheel brakes 103, auxiliary power steering, door openers, etc. of the train. The steering means can be omitted if the train is equipped to run on rails, such as 99, instead of the tires 28 for highway traffic.

Having thus described this invention, what I claim and desire to secure by Letters Patent is:

1. A truck including a pair of side beams having dropped central portions; transverse interspaced bars fixed to the central portions of said beams; transverse axles mounted beneath the ends of said truck respectively, and having wheels thereon; turntables on the opposite ends of said truck above said axles and adapted to support the ends of adjacent coaches; and a motor-generator set slidably mounted upon said bars, means for fixing said motor generator set to said bars, and motive means on said trucks in circuit with said motor-generator and adapted to drive said wheels.

2. A truck including a pair of side beams having dropped central portions; transverse interspaced bars fixed to the central portions of said beams; transverse axles mounted beneath the ends of said truck respectively, and having wheels thereon; turntables on the opposite ends of said truck above said axles and adapted to support the ends of adjacent coaches; springs interposed between said turntables and said coaches; and a motor generator set slidably mounted upon said bars, means for fixing said motor generator to set to said bars; and motive means on said truck in circuit with said motor-generator and adapted to drive said wheels.

3. A truck including a pair of side beams having dropped central portions; transverse interspaced bars fixed to the central portions of said beams; transverse axles mounted beneath the ends of said truck respectively and having wheels thereon; bolsters across the ends of said truck and having king pins above said axles; chafing plates resting upon said bolsters respectively; beams adapted to support the ends of adjacent coaches and having sockets engaging their respective king pins; springs interposed between said chafing plates and said beams; and a motor-generator set mounted upon said bars; and motive means on said truck in circuit with said motor-generator and adapted to drive said wheels.

JOSEPH B. STRAUSS.